May 31, 1932. C. J. DUNZWEILER ET AL 1,860,663

BATTERY CELL

Filed Jan. 23, 1930

Inventors.
Carl J. Dunzweiler.
Henry W. Lormor.
Kwis Hudson & Kent
Attys.

Patented May 31, 1932

1,860,663

UNITED STATES PATENT OFFICE

CARL J. DUNZWEILER, OF CLEVELAND, AND HENRY W. LORMOR, OF CLEVELAND HEIGHTS, OHIO, ASSIGNORS TO WILLARD STORAGE BATTERY COMPANY, OF CLEVELAND, OHIO, A CORPORATION OF WEST VIRGINIA

BATTERY CELL

Application filed January 23, 1930. Serial No. 422,710.

This invention relates to battery cells, and has reference particularly to the construction of cells for storage batteries of the type that are in use upon motor vehicles.

One of the objects of the invention is the provision of wall reenforcements in the form of ribs on the inner sides of the cell walls, these ribs serving also to support the cell cover, thereby taking this burden off the terminal posts of the plate assemblies.

A further object is the provision of ribs of this character located along the side walls adapted to engage the outer portions of the battery element in order to position the same midway between the side walls, the ribs being beveled off at their upper ends so as to guide the battery element into proper position while it is being lowered into the cell.

Other objects and features of novelty will appear as we proceed with the description of those embodiments of the invention which, for the purposes of the present application, we have illustrated in the accompanying drawings, in which Figure 1 is a plan view of a fragment of a storage battery, embodying the preferred form of the invention.

Figure 1:
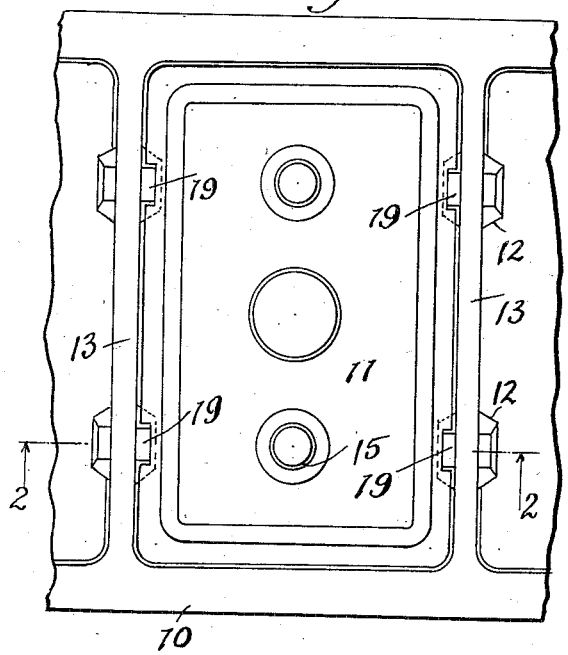

In the drawings a battery box 10 having three compartments or cells is illustrated, the center cell only being shown complete, and this cell only having a cover 11 mounted in position upon the cover supports. The battery box is preferably molded of suitable material such as hard rubber or composition, and the walls of the cells are formed with internal vertical ribs which have the double function of reenforcing the cells and supporting the cell covers 11. These ribs also act to position the plate assemblies centrally in the cells and to guide them to that position when they are being lowered into the cells.

Referring now particularly to Figs. 1 to 4 inclusive, it will be noted that we have shown four vertical ribs 12 molded integral with the side walls 13 of the cell. These ribs extend preferably from the bottom of the cell upward to a point near the top thereof. Their side edges may be inclined from the cell wall toward each other, as indicated in the drawings, and their upper ends are beveled downwardly from the wall as indicated particularly in Fig. 2.

In the latter figure we have shown a battery element comprising positive and negative plate assemblies or units in position in a cell, the plate connecting strap of one of the units being shown at 14 and the corresponding terminal post at 15, the latter extending through a suitable opening in the cover 11. The plates of this unit are marked 16. The intermediate plates which go to make up the other unit are marked 17, the separators being omitted for the sake of clearness. The space between opposed ribs 12 is just sufficient to receive loosely the outer plates 16 when the battery element is lowered into the cell, and the beveled upper ends of the ribs serve to guide the element into its proper position.

Shoulders 18 are formed in the opposite sides of each rib at the beveled upper end of the latter, leaving an intermediate projection 19 with straight sides and a beveled front surface. The cover is notched to receive each of the projections 19, the inner edge 20 of each notch being preferably inclined to correspond with the bevel on the projection 19. While the cover edges 20 come into fairly close engagement with the projections 19, the cover takes its bearing upon the shoulders 18. It is held against lateral movement by the engagement of the cover notches with the sides of the projections 19. In our construction the terminal posts 15 do not have the cover supporting functions which terminal posts are commonly called upon to perform, this function being somewhat detrimental to battery elements in vehicle batteries because of the constant jarring, particularly since the posts in batteries as commonly constructed heretofore are offset sidewise from the connecting straps for structural reasons, and the blows due to the jarring therefore act through a leverage instead of directly downward upon the straps.

Figure 5:
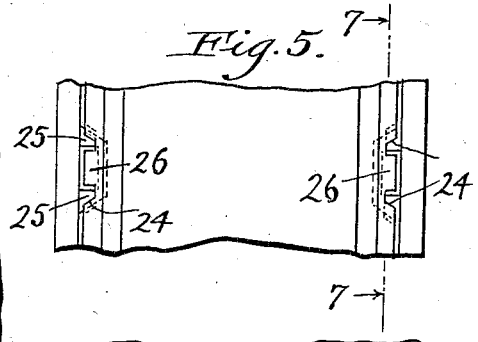
Fig. 5 is a fragmental plan view of a modification of the invention.
Figures 6, 7:
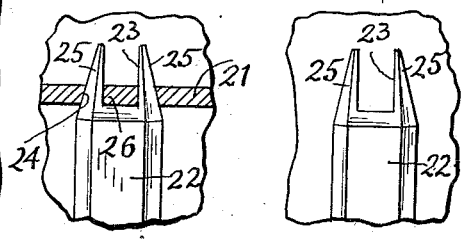
Fig. 6 is an elevational view of a fragment of one of the ribs shown in Fig. 5.
Fig. 7 is a similar view with the cover added, the latter being shown in section on the line 7—7 of Fig. 5.
Figure 2:
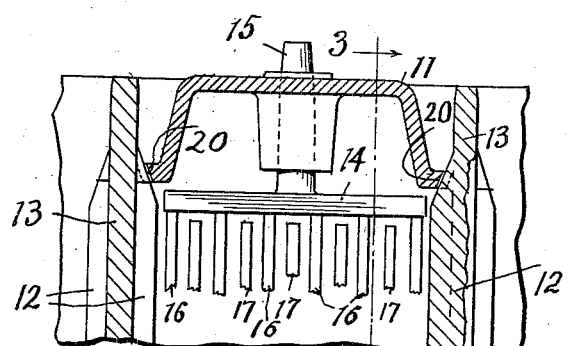
Fig. 2 is a fragmental vertical sectional view taken substantially on the line 2—2 of Fig. 1, showing the upper portion only of the cell structure.
Figure 3:
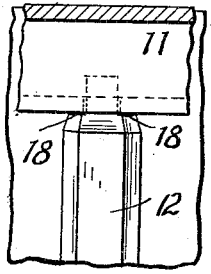
Fig. 3 is a vertical sectional view taken substantially on the line 3—3 of Fig. 2, illustrating the cell and cover only.
Figure 4:
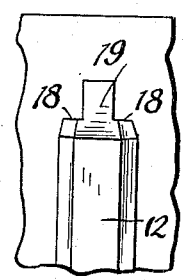
Fig. 4 is an elevational view of one of the ribs.

Referring now to the modification illustrated in Figs. 5, 6 and 7, the upper ends of the ribs 22, corresponding to the ribs 12 of the first described form, are beveled off in the same manner, but instead of being formed with shoulders on their outer sides they have a recess 23 extending downwardly from the top edge of each rib, the supporting shoulder being formed by the lower edge of this recess. The cover 21 opposite each rib is formed with a pair of notches 24 to straddle the two projections 25 left in the rib on either side of the recess 23. The forming of the notches 24 in the cover leaves a tongue 26, which rests upon the shoulder at the bottom of the recess 23 to form a bearing for the cover.

Figure 8:
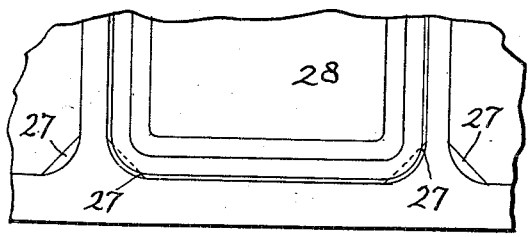
Fig. 8 is a fragmental plan view of a storage battery embodying a further modification of the invention.

In Fig. 8 we have illustrated a further modification, wherein the side ribs 12 or 22 are omitted and the cell is provided with integral corner ribs or fillets 27 extending preferably from the bottom wall of the cell up to a point near the top thereof corresponding with the level of the shoulders 18 in the first described form of the invention. These fillets are flat on their upper ends and support the corners of the cover 28. Beveling of the upper ends of the fillets 27 is unnecessary, since we take advantage of the fact that the lower corners of the battery plates are rounded. This feature of construction in connection with the upper diagonal edge of the fillet serves to guide the battery element into proper position both longitudinally and transversely of the cell.

Variations from the described structures may be employed. Accordingly we desire it to be understood that the scope of the invention is to be regarded as defined by the appended claims rather than by the foregoing description or the accompanying drawings.

Having thus described our invention, we claim:

1. In apparatus of the class described, a battery cell having bottom and upright walls, upright internal ribs on said upright walls terminating beneath the top thereof, said ribs being beveled off on their upper extremities in order to guide a plate assembly into position between the said ribs, and a cover adapted to fit within the walls of the cell, said cover being notched out to receive the beveled upper ends of said ribs, whereby the cover is supported upon said ribs.

2. In apparatus of the class described, a battery cell having upright walls, upright internal ribs on said walls terminating beneath the top thereof, and a cover adapted to be supported within the cell upon said ribs, said cover having notches in its perimeter adapted to straddle said ribs.

3. In apparatus of the class described, a battery cell having upright walls, internal ribs on said walls extending upwardly from the bottom and terminating beneath the top thereof, said ribs being beveled off on their upper extremities, shoulders formed in the upper ends of said ribs, and a cover provided with notches adapted to receive the upper ends of said ribs, the portions of said cover on either side of said notches being adapted to rest upon said shoulders.

4. In apparatus of the class described, a battery cell having bottom, side and end walls, internal vertical ribs on said side walls terminating beneath the top thereof, said ribs being beveled off on their upper extremities in order to guide a battery element into position between the said ribs, shoulders formed on the outer sides of the upper ends of said ribs, and a cover provided with a notch for each rib adapted to straddle the same above said shoulders whereby the cover is supported upon said shoulders.

5. In apparatus of the class described, a battery cell having upright walls, upright ribs on said walls terminating beneath the top thereof, shoulders formed on said ribs near the upper ends thereof, and a cover adapted to rest upon said shoulders and provided with notches for the reception of the upper ends of said ribs.

In testimony whereof, we hereunto affix our signatures.

CARL J. DUNZWEILER.
HENRY W. LORMOR.